3,135,292
SLIDING PIN VALVES
Rex A. Roberts, Groton, Mass., assignor to Improved Machinery Inc., Nashua, N.H., a corporation of Maine
Filed Jan. 17, 1962, Ser. No. 166,890
13 Claims. (Cl. 137—609)

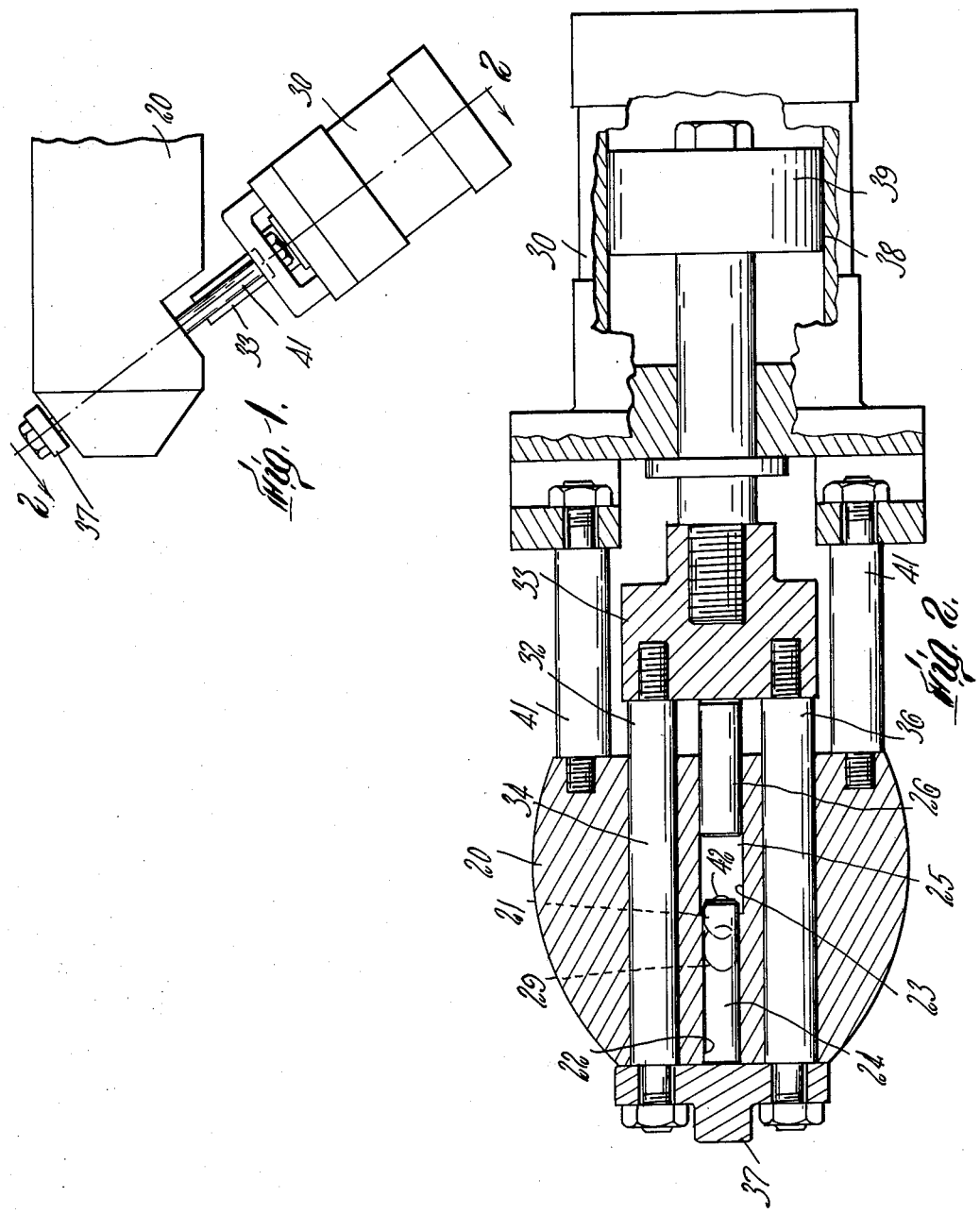

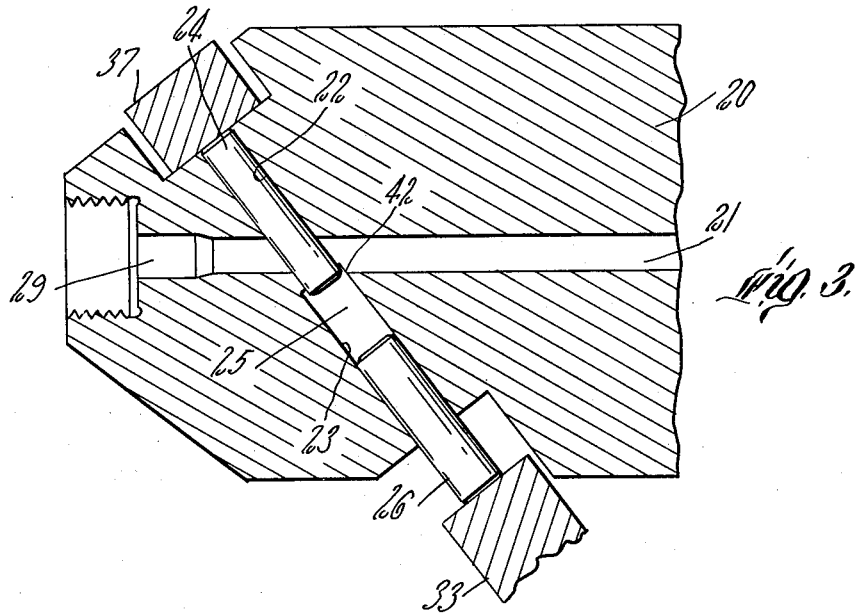
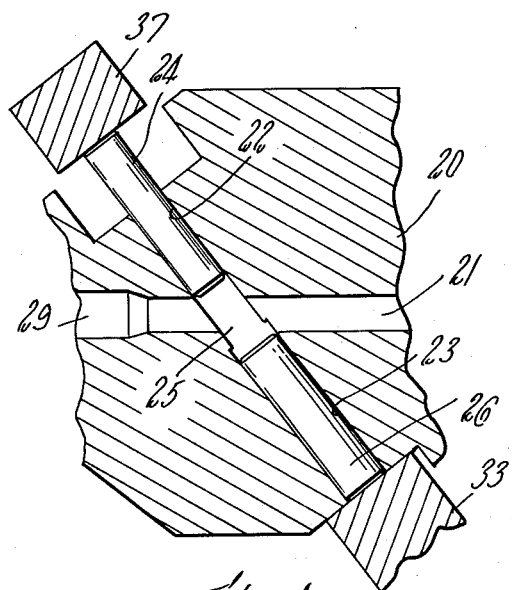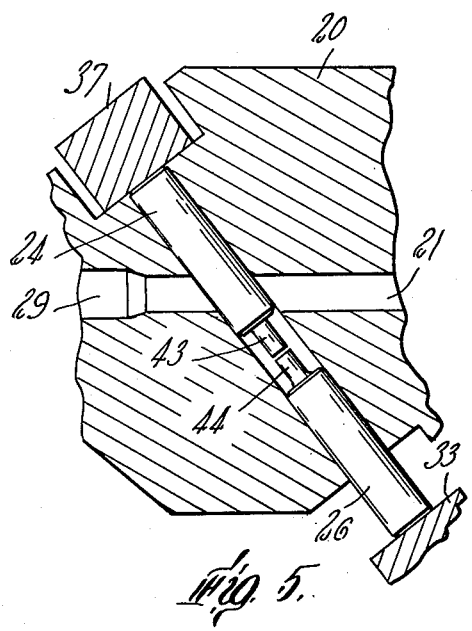

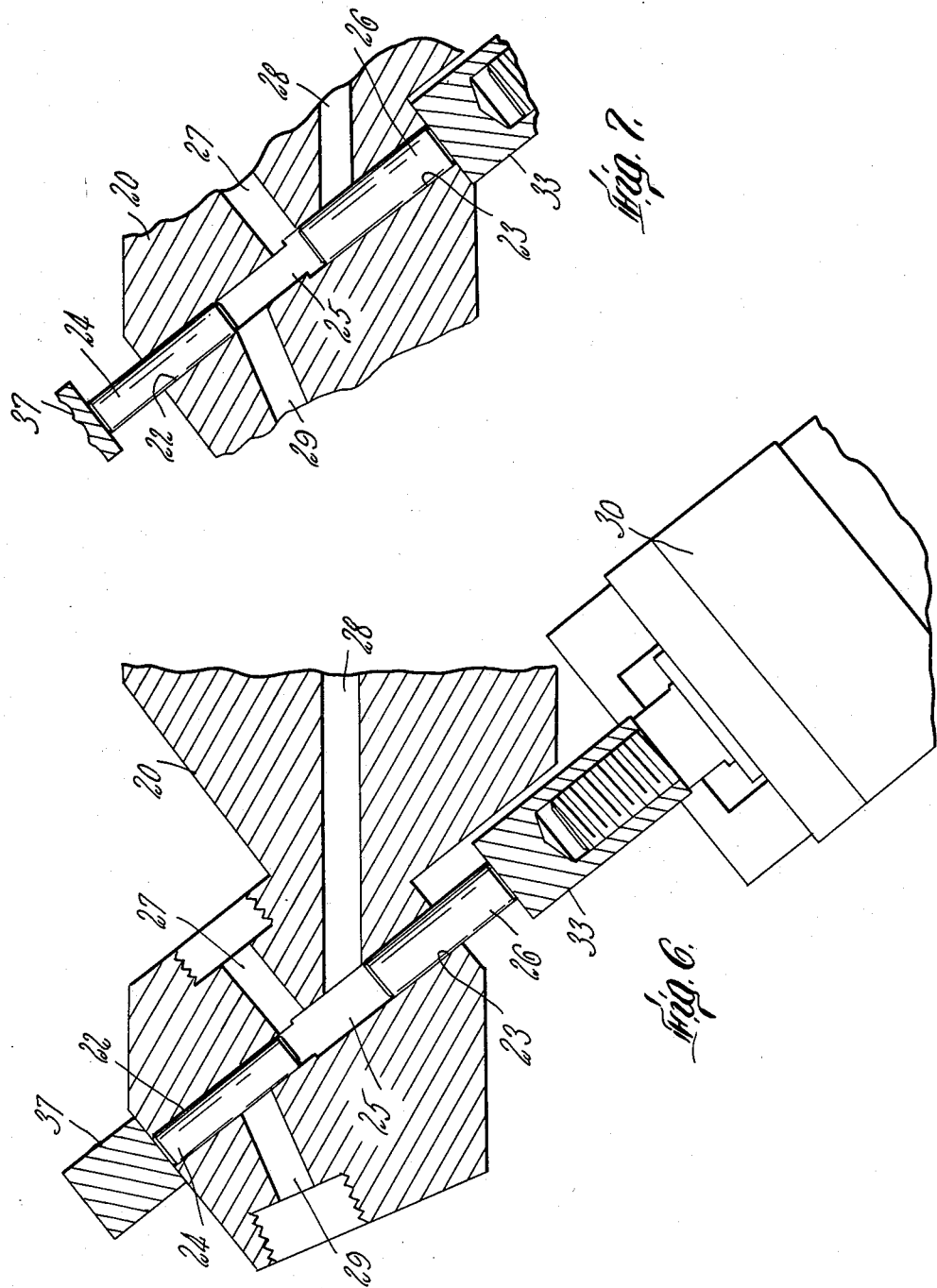

This invention relates to valves for controlling the flow of fluids or semi-fluids, especially in high pressure systems. More particularly the invention relates to valves of the sliding pin type, that is, where the moving valve elements consist of pins which slide generally transversely to the passageways which they are intended to close or open.

The invention is directed to improvements enabling sliding pin valves to control the flow of fluids or semi-fluids dependably under extremely high pressures and severe service without damage to the moving valve elements. One object is to provide such a valve wherein the internal pressures may be balanced so that it requires but a small amount of power to operate. Another object is to provide structures which will allow ready removal of the pins of such valves for inspection, repair or replacement. Still another object is to provide such a valve which is free from flow obstructing parts or elements in the valve passageways. A further object is to include fail-safe constructions in sliding pin valves, such that if power to the normal valve actuating mechanisms should fail, the internal pressure of fluid in the valve would actuate the valve to close it. A still further object includes a feature which will prevent a valve pin from assuming or sticking in an undesired position.

These and other objects of the invention are met by providing a valve in which there are two similar separate spaced sliding pin valve elements, which move generally transversely to a passageway through which flow is to be controlled. In preferred forms, the valve pins are cylindrical in form and mounted to move in opposition within the same bore. The active or inner ends of the valve pins are exposed to and held apart at all times by the pressure of the fluid which is being controlled, with the pins under only a compressive load. The opposite or outer ends of the pins extend outside of the valve proper and each of them bears against a movable valve actuator element, which when moved in one direction, moves one pin in opposition to pressures within the valve and allows the other pin to be acted upon by the fluid pressure in the valve to follow and move with the actuator in an opposite sense. For fail-safe operation, the exposed area of the end of one pin is made larger than that of the other pin whereby on failure of power to the valve actuator the balance of internal pressure in the valve will force the pin of larger end area toward a position causing movement of the other pin through the valve actuator to close the valve passage.

Other objects and further details of that which is believed to be novel and included in this invention will be clear from the following description and claims, taken with the accompanying drawings in which are illustrated examples of valves embodying the present invention and incorporating the spaced sliding pins with inner ends exposed to compression from within the valve system, and outer ends bearing against and restrained by a movable actuator.

In the drawings:

FIG. 1 is an elevational or side view of a valve and actuator according to the invention showing the parts in "closed" position;

FIG. 2 is an oblique sectional view on line 2—2 of the valve and actuator of FIG. 1 on an enlarged scale showing the parts in "closed" position;

FIG. 3 is a vertical sectional view of the valve shown in FIG. 2 with the parts in "closed" position;

FIG. 4 is a similar sectional view of the valve but showing the parts in the other or "open" position;

FIG. 5 is a vertical sectional view like FIG. 3 but showing a modification of the valve of that figure;

FIG. 6 is a vertical sectional view like FIG. 3 of a further modified form of valve showing the parts as they will appear in one position of operation which may be called the "fill" position, and FIG. 7 is a similar view showing the parts of this modified valve as they will appear in another position of operation, called the "inject" position.

Valve structures of this invention are intended especially for extreme high pressure applications such as those encountered for example, in plastic injection molding machines although obviously other uses for such valves will be apparent when their characteristics are known.

Also, although the valves here shown include coaxial cylindrical pins, the valve pins need not be coaxial for some of the desired effects of the invention and the pins do not have to be cylindrical, although the coaxial cylindrical arrangement lends itself to most economical manufacture and facilitates addition of other desirable features hereinafter described.

Referring to the forms of valve shown in all figures, there is a valve body 20 having an inlet passage 21. Passage 21 leads from a source of fluid or semi-fluid under pressure. Intersecting and preferably arranged diagonally with respect to the inlet passage 21 are opposed cross passages 22 and 23 which serve to guide spaced sliding valve pins 24 and 26 respectively. A discharge or outlet passage 29 is also provided in the body of the valve beyond the intersecting valve pin passages 22 and 23 and the outlet may be provided with suitable connection details for a fitting leading to a discharge area or receptacle. Passages 21, 22, 23 and 29 carry the flow of liquid through the valves and may be called flow passages.

When the sliding pins 24 and 26 are in the "closed" position shown in FIGS. 2 and 3, pin 24 blocks the flow of fluid from the inlet 21 to the outlet 29. When the pins are in the "open" position of FIG. 4, neither pin blocks the flow of fluid through the valve but the inner end of each pin is exposed to the pressure of the fluid flowing therethrough, holding the pins apart and creating a space 25 between them which permits flow of fluid under pressure from the inlet 21 to the outlet 29. Pins 24 and 26 fit closely within although they are slidable with respect to the corresponding portions of cross-passages 22 and 23. For easy manufacture and dependable action in use these pins are preferably made cylindrical in form and the passages 22 and 23 are aligned axially with each other.

In order to control the positions of the valve pins 24 and 26, a valve actuator 30 is mounted outside of the valve proper, and it may be supported from the valve body as shown. In the forms illustrated, the actuator is a sliding yoke 32 made up of a base piece 33, strain bars or rods 34 and 36 slidably mounted in or alongside the valve body 20 outside of the valve passages, and a head or cross piece 37, these parts being held together preferably removably by threaded connections and nuts as shown. The outer end of pin 24 bears against the cross piece 37, while the end of pin 26 bears against base piece 33. When the valve actuator yoke 32 is moved in one direction, one of the valve pins will be pushed by the yoke and the other pin will move with the yoke in an opposite sense because of the internal pressure in the space 25 in the passages 22 and 23, neither pin being secured to the actuator, although they could be.

It will be noted that both pins are under compressive strain only and that the strain of tension tending to separate the valve pins because of internal pressure is carried entirely by the rods 34 and 36 and the end pieces 33 and 37. These rods and connecting end pieces may therefore be made of a proper size and strength to sustain the strains expected, without making the equipment as a whole of massive dimensions. In a conventional valve with a reciprocating spool shaped element joined at one end to an actuator, the central bar connecting the ends of the spool would have to bear all the strain of tension and the valve actuator would have to be powerful enough to close the valve under opposition of most of the fluid pressure within the valve. In valves according to the present invention the loads on the valve elements are always compressive loads as above explained, and because these loads are exerted in opposite directions in the path of movement of the valve actuator this valve may be balanced so that little force is required to close the valve.

Power for operation of the valve actuator 30 may be obtained from a hydraulic ram cylinder 38 having an internal piston 39 with its rod threaded or otherwise connected to the base member 33 of the yoke as shown. The ram cylinder 38 may be supported from the valve body 20 as by bolts 41 or in other suitable fashion. From a suitable source of fluid under pressure (not shown) pressure may be supplied to one face or the other of the piston 39 within the cylinder 38 to move the valve actuator in the desired direction to close or open the valve, in a manner which will be readily understood. Obviously, power for moving the valve actuator might be applied in any desired fashion.

If for some reason the pressure operating piston 39, or other power operating the actuator, should fail, it is in some applications desirable for the pin 24 to close the outlet passage 29 so that fluid will not continue to flow from the valve. In order to provide a fail-safe arrangement in such eventuality, the exposed end area or diameter of the pin 24 and of that part of the passage 22 in which it works is made smaller than the diameter of pin 26 and of the portion of the passage 23 in which it works. In the drawings this difference in diameter is exaggerated for illustration although in practice it need not be great. For example, in one valve made according to this invention, the passage for the smaller pin was made having a diameter of .500 of an inch and the larger section of the passage had a diameter of .525 of an inch. The pins were made of corresponding diameters to fit closely but slide freely in their respective parts of the passages. Thus, if the pressure to the piston 39 should fail when the valve pins are in the "open" position of FIG. 4, the net differential of the pressure of the fluid in the valve itself against the ends of the pins 24 and 26 would result in greater force being applied to the pin 26 having the larger exposed end area. This would force the parts including the yoke as well as the pins toward the "closed" position of FIG. 3. Further pressure from the inlet passage 21 would result only in further closing movement of the pin 24 until the outlet 29 is fully blocked. Note that in the closed position of FIGS. 2 and 3 the edge or circumference of the pin 24 remains slightly above the bottom of inlet 21 because of the slant of the cross passage 22 so that a small opening 42 is provided to passage 23 in the space 25 extending between the pins 24 and 26. This means that whenever the valve actuator element fails to be supplied with sufficient power to operate it, the internal pressures in the valve structure will tend to force the valve toward the closed position.

FIG. 5 shows a modification applied to the form of valve of FIGS. 1–4 and which also could be applied to the modification of FIGS. 6 and 7. This consists of an extension or projection 43 of reduced diameter on the end of valve pin 24 and a corresponding opposed projection 44 on the valve pin 26. Theoretically one of these extensions could be lengthened and the other eliminated, but both are preferred. These projections act as separators to hold the valve pins 24 and 26 apart at all times so that the valve pins will not collapse toward each other even though there should be an absence of pressure or negative pressure in the passages 21, 22 and 23, or if one of the pins should stick or tend to assume an unwanted position. If the projections are undesirable, the outer end of each pin can be secured to the element of the actuator yoke against which it bears, thus preventing collapse of the pins toward each other.

In the form of valve shown in FIGS. 6 and 7, the outlet 29, valve pins 24 and 26 and cross passages 22 and 23 are all provided in a manner somewhat like that of the other figures of the drawings. However, in this form of valve a side passage 27 functions as the pressure inlet for the open outlet 29. An auxiliary or secondary passage 28 which, in this embodiment of the invention, is closed or opened by the valve pin 26 depending upon its position, may feed fluid to or from the flow passages in the valve when the outlet 29 is closed by pin 24. When the outlet is open, pressure for flow of fluid previously fed to the valve may be imposed through passage 27 to cause flow from the outlet. In a valve for plastic molding the passage 28 may feed melted plastic to the valve and to passage 27 when the outlet 29 is closed and this may be called the "fill" position. When the outlet is open, injection pressure may be imposed through passage 27, and this position of the valve may therefore be called the "inject" position. In another arrangement, this form of valve may be connected in a fluid system so that passage 27 serves as the inlet for fluid under pressure at all times, with outlet 29 and secondary passage 28 becoming alternative outlets opened or closed depending upon the position of the valve actuator and corresponding positions of the pins 24 and 26.

So as to prevent pocketing of inert liquid in the valve according to FIGS. 6 and 7, the space 25 between the inner ends of the valve pins is designed exactly to span the passage 27 and the passage 29 when the valve is in one position, and to span the passage 28 and the passage 27 when the valve is in its other position. In this way, in either position of the valve, all of the liquid between the ends of the valve pins will be in a flow path and movable under pressure.

As in the case of the other forms of valves shown, if the valve actuator should fail to be supplied with power, and pin 24 is smaller than pin 26, the unbalanced pressure on the pins will always tend to force the valve pins toward "closed" position, shutting off outlet 29. This is so whether the internal pressure of the valve originates in passage 27 or in passage 28.

In all forms of valve shown, because the inner ends of both the valve pins are always subjected to substantially the same internal pressures in passageway 22 and 23, acting in opposite senses or directions, the load on the actuator is substantially in balance so that but a small amount of power is required to move the valve in either direction.

Naturally, because there is no tension connection needed inside the valve between the active inner ends of the valve pins, the fluid passing through the valve has a free flow and is not obstructed. The internal pressure holds the pins apart in properly spaced relation, and the yoke or actuator, being outside the valve passageways, is not limited in size by the size of the flow passages or the size of the pins in the valve but may be as heavy and large as necessary to withstand the internal pressures tending to separate the pins.

As will be evident from the foregoing, certain aspects of this invention are not limited to the particular details set forth as examples, and it is contemplated that various and other modifications and applications of the invention will occur to those skilled in the art. Therefore it is intended that the appended claims shall cover such modifications and applications as do not depart from the true spirit and scope of the invention described.

What is claimed as new and is desired to be secured by Letters Patent of the United States is:

1. A valve for fluids and the like under pressure comprising, a valve body, an inlet and an outlet therein, a flow passageway extending therethrough from inlet to outlet for fluid under pressure, a first valve receiving passageway intersecting said flow passageway and extending to the outside of said valve body, a first valve pin closely fitting and slidable between two positions within said first valve passageway with an inner end face thereon always exposed to said flow passageway and under fluid pressure from said inlet; said pin blocking said flow passageway to said outlet when in one of its said positions, a second valve receiving passageway intersecting said flow passageway and extending to the outside of said valve body, a second separate valve pin closely fitting and slidable between two positions within said second valve passageway with an inner end face thereon always exposed to said flow passageway and under fluid pressure from said inlet, a movable actuator outside said flow and valve passageways, spaced bearing portions on said actuator engageable against each of said pins from outside said valve body, the fluid pressure from said inlet in said flow passage against the inner end faces of said pins urging them outwardly of said valve body and holding said pins against said spaced bearing portions, said actuator being movable in opposite directions between two positions, in one of which the actuator bears against and moves said first valve pin in a direction toward its flow passageway blocking position aforesaid while said second valve pin follows the actuator movement in the opposite sense under pressure from said flow passageway on its end face, and in the opposite of which positions the actuator bears against and moves said second valve pin while said first valve pin follows the actuator movement in the opposite sense under pressure from said flow passageway on its end face in a direction away from its flow passageway blocking position, and means for selectively moving said valve actuator between its said two positions.

2. A valve for fluids and the like under pressure comprising a valve body, an inlet and outlet therein, a main flow passageway extending therethrough from inlet to outlet for fluid under pressure, a first valve receiving passageway intersecting said flow passageway and extending to the outside of said valve body, a first valve pin closely fitting and slidable between two positions within said first valve passageway with an inner end face thereon always exposed to said flow passageway under pressure from said inlet and an opposite end exposed outside the valve body, said pin blocking said flow passageway to said outlet when in one of its said positions, a second valve receiving passageway coaxial with said first valve receiving passageway, intersecting said flow passageway and extending to the outside of said valve body, a second separate valve pin closely fitting and slidable between two positions within said second valve passageway with an inner end face thereon always exposed to the said flow passageway under pressure from said inlet, said end face being opposite and spaced from said inner end face of said first valve pin, an opposite end on said second valve pin exposed outside the valve body, a slidable valve actuator yoke outside said flow and valve passageways, opposed spaced bearing portions on said yoke each engageable against the end of one of said pins exposed outside said valve body, the fluid pressure in said flow passageway holding said inner end pin faces in their said spaced relation and urging said pins outwardly of said valve body against said spaced bearing portions, said actuator yoke being slidable in opposite directions between two extreme positions, in one of which the yoke bears against and slides said first valve pin in a direction toward its flow passageway blocking position aforesaid while said second valve pin follows the yoke movement in the opposite sense under pressure from said flow passageway on its inner end face, and in the opposite of which positions the yoke bears against and slides said second valve pin while said first valve pin follows the yoke movement in the opposite sense under pressure from said flow passageway on its inner end face in a direction away from its flow passageway blocking position, and means for selectively sliding said valve actuating yoke between its said two positions.

3. A valve according to claim 1 in which the end faces of both valve pins are exposed always to pressures from said inlet in said flow passageway and in which the area of the end face of said first valve pin is less than the area of the end face of the second valve pin, whereby upon failure of the means for moving the valve actuator the fluid pressure from said inlet against the end face of said second valve pin will overbalance the fluid pressure against the end face of said first valve pin and force the actuator to move said first pin to its flow passageway blocking position.

4. A valve according to claim 2 in which the main flow passageway extends in substantially a straight line between said inlet and outlet in the valve body and said intersecting valve passageways guide the valve pins in coaxially aligned paths diagonal to said main flow passageway.

5. A valve according to claim 1 in which said valve receiving passageways are coaxially opposed and aligned with respect to each other and said valve pins are cylindrical.

6. A valve according to claim 1 including means in addition to the fluid pressure from said inlet in said flow passageway for holding said pins against said spaced bearing portions on said actuator.

7. A valve according to claim 2 including a projection on the inner end face of one of said valve pins adapted to cooperate with the other valve pin to hold the end faces of said separate pins in spaced relation from one another.

8. A valve according to claim 2 having the inner end faces of both valve pins exposed always to pressures in said flow passageway, the area of the inner end face of said first valve pin being less than the area of the inner end face of said second valve pin, whereby upon failure of the means for sliding the actuating yoke, fluid pressure imbalance will force the yoke to move said first pin to block said outlet.

9. A valve according to claim 1 in which said valve receiving passageways are arranged coaxially with respect to each other.

10. A valve according to claim 1 in which said valve pins are cylindrical in form.

11. A valve according to claim 1 in which said valve receiving passageways each intersect said flow passageway at an acute angle.

12. A valve for fluids and the like under pressure comprising, a valve body, a valve receiving passageway extending therethrough to the outside of said valve body, a pair of separate valve pins closely fitting and slidable together between two positions within said valve passageway, each pin having an end face thereon spaced from the other and exposed to fluid under pressure in the space between said pin end faces, a movable actuator outside said valve passageway, spaced bearing portions of said actuator engageable against each of said pins from outside said valve body, the pressure of fluid in said valve passageway holding said pins in spaced relation and against said bearing portions, an outlet passageway intersecting said valve passageway near one end thereof, a secondary passageway intersecting said valve passageway near the other end thereof, a third passageway intersecting said valve passageway intermediate said outlet and secondary passageways, means moving said actuator in opposite directions between two positions in one of which the actuator bears against and moves one valve pin to a position where it blocks said outlet passageway while the other valve pin, under pressure of fluid between said pin end faces, follows the actuator movement to unblock said secondary passageway and in the other position the actuator bears against and moves said other valve pin to block said secondary passageway while said one valve pin, under pressure of fluid between said pin end faces, follows the actuator to unblock said outlet passageway, said third intermediate passageway being located within the space between the valve pin end faces in both positions of said actuator and pins.

13. A valve as claimed in claim 12 in which said space between said valve pin end faces is the same as the space spanning said outlet and intermediate passageways in one position of said actuator and pins, and the same as the space spanning said secondary and intermediate passageways in the other position of said actuator and pins.

References Cited in the file of this patent

UNITED STATES PATENTS

| | | |
|---|---|---|
| 1,840,961 | Kuenzler | Jan. 12, 1932 |
| 1,999,493 | White | Apr. 30, 1935 |
| 2,788,192 | Mountford | Apr. 9, 1957 |